June 17, 1958
R. R. BROWN
2,839,636
ELECTRIC CONNECTION
Filed Nov. 17, 1955
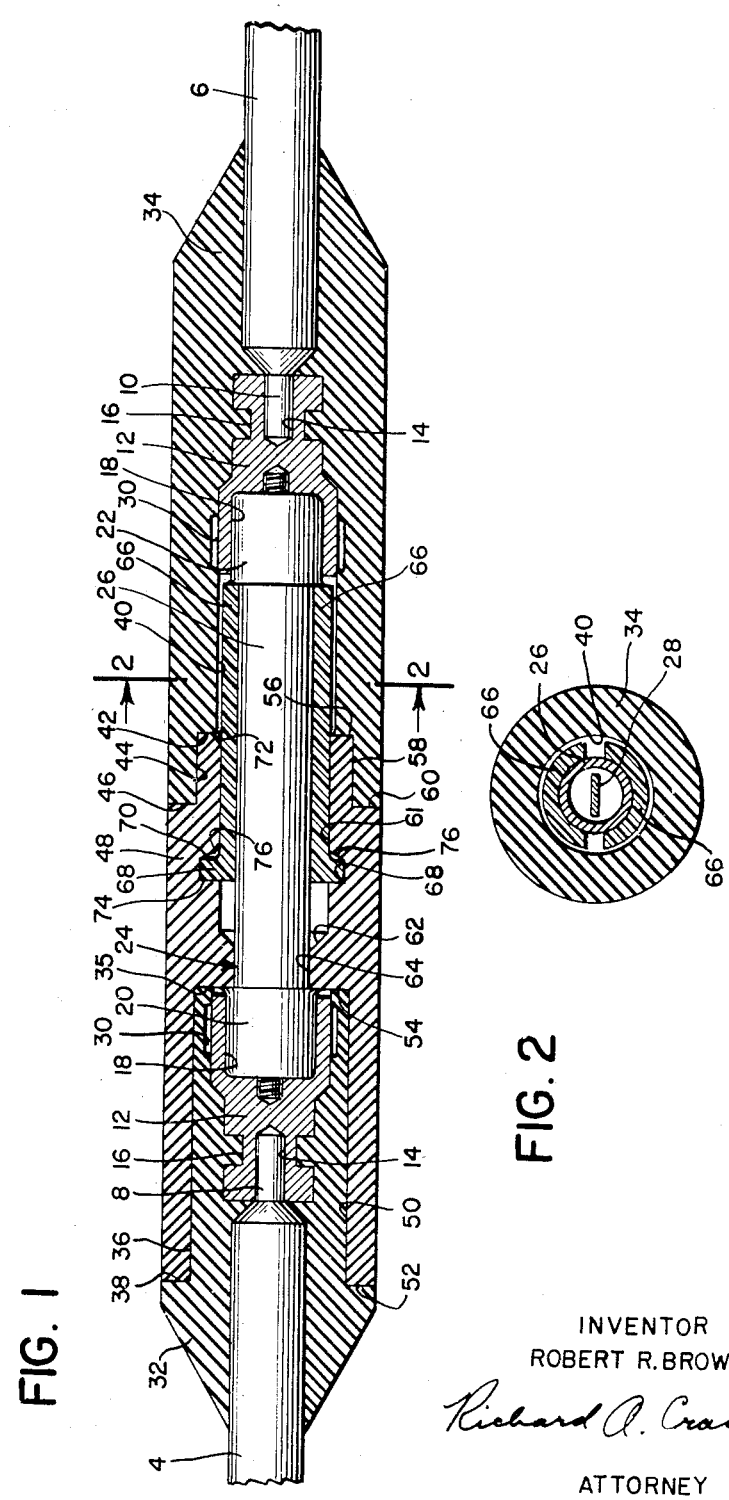
INVENTOR
ROBERT R. BROWN
*Richard A. Craig*
ATTORNEY United States Patent Office 2,839,636
Patented June 17, 1958

2,839,636
ELECTRICAL CONNECTION

Robert R. Brown, Mountainside, N. J., assignor to Elastic Stop Nut Corporation of America, Union, N. J., a corporation of New Jersey Application November 17, 1955, Serial No. 547,358

14 Claims. (Cl. 200—133)

The present invention relates generally to electricity and more specifically to electrical connections in which an electrical circuit is completed between a plurality of conductors by an electrical circuit element such as a fuse.

More specifically the invention contemplates a readily made and readily separable connection which when made can be safely placed on the surface of the ground, directly buried in the ground or immersed in water or in even salt water.

The invention also contemplates the provision of male and female cable connectors and a novel assembly of an electrical circuit element and a protective covering therefor, the connectors being capable of ready connection to the assembly electrically to connect the conductors of the cables by means of the circuit element.

The invention further contemplates the provision of an assembly as referred to above wherein the circuit element is a fuse.

It is therefore an important object of the invention to provide a readily made and readily separable electrical connection for use as outlined above.

It is a further object to provide a novel assembly of an electrical circuit element such as a fuse and a protective covering therefor which is capable of ready connection by hand to the connectors.

It is a further object to provide such an assembly which is expendable and which can be readily replaced in a connection of the type referred to above.

It is another object to provide such a connection the components of which are of simple inexpensive construction.

Briefly, a preferred example of the invention comprises an electrical connection in which two cables are electrically joined by a circuit element such as a fuse. The cables comprise electrical conductors provided with coverings, including insulating material and are terminated by connectors comprising casings of insulating material bonded to the insulating material of the cables. The circuit element is part of an assembly which also includes a casing of insulating material, and an interference, watertight fit exists between the casing of the assembly and the casing of each connector, the components of the connection being separably plugged together.

The above and other objects and advantages will become evident from the following description of a preferred embodiment of the invention and the accompanying drawings thereof in which:

Fig. 1 is a view in longitudinal section of an electrical connection incorporating a fuse; and Fig. 2 is a sectional view taken on line 2—2 of Fig. 1.

In Fig. 1 there is shown a fused electrical connection between two cables 4 and 6 comprising electrical conductors 8 and 10, respectively, which may be solid or stranded and which are provided with coverings including insulating material. Such insulating material may comprise the sole coverings for the conductors or may be only a part of the coverings, which part may be either external or internal. The ends of cables 4 and 6 are skived to remove the coverings for predetermined and as shown equal lengths of conductors 8 and 10. Preferably the skived ends of the coverings are bevelled as shown.

It will be assumed by way of example that each of cables 4 and 6 comprises an inner covering of insulating material and an outer jacket of some other material the primary purpose of the latter being to provide physical protection.

Each of two identical members 12 of suitable electrically conductive material, such as copper, has at one end a socket 14, and conductors 8 and 10 are inserted into sockets 14. Members 12 are secured to conductors 8 and 10 as by soldering. Each member 12 is provided with an external circumferential groove 16 the purpose of which will be brought out shortly.

The end of each member 12 remote from socket 14 is provided with a larger socket 18.

Sockets 18 are adapted removably to receive electrically conductive end caps 20 and 22 of an ordinary cartridge-type fuse indicated generally at 24. Fuse 24 also has a cylindrical housing 26 of insulating material and a fuse element 28 therein joining caps 20 and 22.

The walls of members 12 may be split lengthwise at sockets 18 to impart a resiliency thereto. In addition, split rings 30 of spring metal are provided surrounding and engaging the walls of members 12 at sockets 18. The inside diameter of sockets 18 is normally slightly larger than the outside diameter of caps 20 and 22 and rings 30 reduce the diameter of sockets 18 to a size normally slightly less than the diameter of caps 20 and 22. Thus when caps 20 and 22 are inserted into sockets 18 to achieve the desired electrical connection between cables 4 and 6, sockets 18 are expanded to set up reactive forces against caps 20 and 22 to insure tight connections.

As aforesaid, one of the principal objects of this invention is to provide means for electrically connecting the conductors of cables with an electrical element such as a fuse, in which the connection can with impunity be installed in locations exposed to the elements, such as on the surface of the ground, buried directly in the ground, or immersed in water or even salt water.

To attain such an object, it is necessary that the connection described above be provided with additional protection. Accordingly, by known molding methods, the assembly comprising the skived end of cable 4 and its associated member 12 and ring 30 is provided with a casing 32 of insulating material bonded to and providing a permanent hermetic seal with the insulating material of cable 4 and preferably with the jacket as well. Similarly the assembly comprising the skived end of cable 6 and its associated member 12 and ring 30 is provided with a casing 34 bonded to and providing a hermetic seal with the insulating material of cable 6 and preferably with the jacket as well. Conveniently casings 32 and 34 may be of the same material. The bonds with the insulating material are attained by virtue of the fact that the skived ends of cabels 4 and 6 are bevelled as shown.

Further attention must be given to the material selected for casings 32 and 34.

Primarily, the material must be moldable and in order to be fully satisfactory should possess certain additional properties of which the following are important. It should be non-porous to both gases and liquids and should be substantially impervious to acids and alkalis of the kind and concentrations ordinarily encountered in earth installations. It should be substantially impervious to deterioration from the action of the atmosphere, particularly with reference to sun rays. It should be capable of resisting, without adversely affecting its mechanical and electrical properties, extremes of temperature conditions from subzero temperatures to the high temperatures encountered in above ground installations in tropic or desert locations. It should be relatively firm and non-frangible and must have a certain degree of elasticity. It should be as free as possible from inherent "aging" with time. It should have reasonably good physical properties, particularly the quality of toughness and should have relatively high dielectric strength. Furthermore it must be "compatible" with the material or materials to which it is to be bonded, to the extent required to provide a hermetic seal as referred to above. Flexible cables suitable for direct ground burial have previously been employed and in the development of such cables, it has been found that in the present state of the materials art, the class of materials which most satisfactorily meets requirements of the nature of those noted above are synthetic polymers of compounds productive of products generically known as "synthetic rubber," of which the following may be mentioned as examples, each of which possesses the aforesaid properties to a greater or lesser extent: "GR–S" (Government rubber, styrene) a polymeric product of butadiene and styrene; "low temperature rubber," also a polymeric product of butadiene and styrene; "neoprene," which is a generic term for a number of chloroprene polymers of different grades and designated as GR–M plus numerical designations for the several grades; "Butyl rubber" a copolymer of isobutylene and isoprene; and "Buna N" (GR–A, Government rubber, acrylonitrile), a copolymer of butadiene and acrylonitrile. To those skilled in the materials art it will be evident that a substantial variety of materials suitable for the purposes are available. Such other materials may include synthetic resins such as "polythene." Also, while it is possible to mold a casing from natural rubber which can be bonded to cables covered with compatible material the use of natural rubber is not to be recommended because of its inherent deterioration with time, or so-called "aging" characteristic. The specific material employed will therefore be dictated by specific conditions in different cases.

Of the foregoing materials, properly compounded neoprene is highly satisfactory and for purposes of further description herein it will be assumed, without limitation, that neoprene is the material employed.

It will be further assumed with respect to cables 4 and 6 that the inner covering is natural rubber and that the jacket is neoprene, to both of which neoprene is bondable.

Casings 32 and 34 are formed by molding the casing material around the respective aforesaid assemblies, and at the completion of the molding operations form in effect unbroken enlarged continuations of the sheathing of cables 4 and 6, respectively.

As shown, casing 32 embeds therein and is bonded to a substantial length of the jacket of cable 4, and the entire axial length of its associated member 12 and ring 30, terminating at a stop shoulder 35 a short distance past the open end of its socket 18. Casing 32 is substantially solid and comprises a relatively long cylindrical external surface 36 extending from the end of casing 32 remote from cable 4 to a stop shoulder 38. The complete assembly involving casing 32 can be conveniently referred to as "the male connector." Casing 32 is also bonded to the insulation of cable 4 at its skived, bevelled end.

Correspondingly, casing 34 embeds therein and is bonded to a substantial length of the jacket of cable 6, and the entire axial length of its associated member 12 and ring 30. However, casing 34 extends a substantial distance beyond the open end of its socket 18, providing a relatively long internal cylindrical surface 40 of diameter substantially equal to the outside diameter of member 12 at socket 18, a stop shoulder 42 at the end of surface 40 remote from cable 6, a relatively short internal cylindrical surface 44 extending from shoulder 42 away from cable 6 and of greater diameter than surface 40, and a stop shoulder 46 at the end of surface 44 remote from shoulder 42. The complete assembly involving casing 34 can be conveniently referred to as "the female connector." Casing 34 is also bonded to the insulation of cable 6 at its skived, bevelled end.

During the molding of casings 32 and 34 the molding material fills grooves 16 in members 12, thus providing means additional to the solder anchoring members 12 in their respective casings.

Furthermore, casings 32 and 34 provide relatively stiffly resilient backings for spring rings 30, thus in effect stiffening rings 30 to enhance the grip of sockets 18 on caps 20 and 22.

Wherever the conductors of the cables are covered with a plurality of different materials, it is possible that the outer material might be punctured to admit water between the materials. Such water might advance toward a connector by a sort of capillary action, and it is desirable that it be denied access to the metallic parts of the connector. Such a water block is as shown established by virtue of the fact that casings 32 and 34 are bonded not only to the cable jackets but also to the inner coverings at the bevelled portions of the skived cable ends, as aforesaid.

A generally cylindrical casing 48 is also provided for purposes which will be brought out shortly and is preferably somewhat resilient and is advantageously molded of the same material as are casings 32 and 34.

Casing 48 has an internal cylindrical surface 50 of substantially the same length as surface 36 of the male connector and terminating at one end of casing 48 at a stop shoulder 52. The other end of surface 50 terminates at a stop shoulder 54. The relative normal diameters of surfaces 36 and 50 are such that the latter can be inserted into the former by hand in an interference or frictional fit which will provide what may be called a "water seal" along the surfaces. When surfaces 36 and 50 are fully engaged as shown in Fig. 1 stop shoulders 35 and 54 on the one hand and 38 and 52 on the other hand abut each other.

At its other end casing 48 has a stop shoulder 56 which defines one end of an external cylindrical surface 58, the other end of which terminates at a stop shoulder 60. Surface 58 is of substantially the same length as surface 44 of the female connector and the relative normal diameters of these two surfaces are such that surface 58 can be inserted into surface 44 also by hand in an interference or frictional fit which will provide a second but relatively shorter water seal. When surfaces 44 and 58 are fully engaged as shown in Fig. 1 stop shoulders 46 and 60 on the one hand and 42 and 56 on the other hand abut each other.

Casing 48 has an axial opening from shoulder 54 to shoulder 56, and housing 26 of fuse 24 passes through the axial opening, with cap 20 located within surface 50 and with its flanged end abutting shoulder 54. Cap 22 and a predetermined portion of the length of housing 26 extend outwardly of casing 8 beyond shoulder 56.

The axial opening through casing 48 is of relatively large diameter as shown at 61 for a predetermined distance from shoulder 56 toward shoulder 54 where it is bevelled as shown at 62 to a smaller diameter as shown at 64. The diameter of the opening at 61 is such that cap 20 can pass substantially freely therethrough, while the diameter of the opening at 64 is such that housing 26 is snugly engaged by casing 48.

It is desirable but may not be necessary to provide additional means for assuring that fuse 24 will be positioned as aforesaid with respect to casing 48. Such additional means is shown in the form of a sleeve of insulating material such as nylon comprised of two halves 66 as clearly shown in Fig. 2. The inside diameter of sleeve halves 66 is the same as the outside diameter of housing 26 and the outside diameter of halves 66 is such that they are snugly engaged by casing 48 at 61.

One end of each of sleeve halves 66 is plain and the other end has an external flange 68 which is in a recess 70 in the opening through casing 48.

The length of sleeve halves 66 is such that with flanges 68 in recess 70 the plain ends are located from shoulder 54 a distance equal to the exposed length of housing 26. Thus with cap 20 engaging shoulder 54 as aforesaid and with flanges 68 in recess 70 the plain ends of sleeve halves 66 abut the flanged end of cap 22, and fuse 24 is positively held in proper axial position with respect to casing 48.

Sleeve halves 66 also perform the function of filling the otherwise empty space between housing 26 and casing 48 at its axial location corresponding to surface 58, thus to reinforce that surface to prevent it from collapsing inwardly and possibly breaking the water seal with surface 44.

The assembly comprising fuse 24, casing 48 and sleeve halves 66 may be factory-made simply by applying sleeve halves 66 to fuse casing 26 in the illustrated relative positions, inserting cap 20 in the axial opening of casing 48 from the right as viewed in Fig. 1 and pushing cap 20 through portion 64 of the axial opening. In so doing cap 20 will expand casing 48 at 64 and sleeve halves 66 will expand casing 48 at 61. Entry of cap 20 into portion 61 is facilitated by bevel 62 and entry of sleeve halves 66 into portion 61 may be facilitated by providing shoulder 56 with a bevel 72 and/or by rounding the entering ends of sleeve halves 66 as shown at 74.

The above method of assembling fuse 24 and casing 48 is deemed preferable to a method in which the casing is molded around the fuse, since molding requires elevated temperature likely to be sufficient to melt fuse element 28.

To assure that flanges 68 will enter recess 70 properly it may be desirable to bevel the entering end of recess 70 as shown at 76.

In use the desired connection is readily made simply by placing the parts in the relative axial positions shown in Fig. 1 and pushing them together. The result is an electrical connection which requires no additional protection for use in all types of conditions as aforesaid. Casings 32 and 34 are hermetically sealed to cables 4 and 6, respectively, surfaces 36 and 50 provide a relatively long water seal between casings 32 and 48, and surfaces 44 and 58 provide a relatively short water seal between casings 34 and 48.

In the event that fuse 24 must be replaced it is simply necessary to reverse the above procedure, substitute a new assembly of casing 48, fuse 24 and sleeve halves 66, such assemblies being expendable, and remake the connection as aforesaid.

In separating the connection the first step will normally be that the maintenance man will grasp casing 48 in one hand and casing 34 in the other hand and pull. Thus the first break in the connection will occur at the junction of casings 48 and 34. Because of this feature it is desirable that cable 6 be the hot or live line, to avoid shock hazard, since member 12 in casing 34 is relatively deeply buried therein.

From the foregoing it will be appreciated that the invention is well adapted to the attainment of the stated objects and others.

Although the invention has been illustrated and described as incorporating a fuse, this is by way of illustration only. Different types of electrical components can be substituted without going outside of the invention.

What is claimed is:

1. An electrical connection between a plurality of cables each of which has a conductor covered with insulating material, comprising an electrically conductive connector element in electrical contact with each said conductor, first and second casings of insulating material bonded to the insulating material of said cables, and an assembly including an electrical circuit element having a terminal in separable engagement with each said connector element and a third casing of insulating material having portions separably overlapping and providing water seals with corresponding portions of said first and second casings and being in interference fit therewith, said third casing having a lengthwise opening and an annular shoulder at one end of said opening and said circuit element having a first portion in said opening and in snug engagement with the wall of said opening and a second portion of larger diameter than said opening abutting said shoulder to position said circuit element with respect to said third casing.

2. An electrical connection between a plurality of cables each of which has a conductor covered with insulating material, comprising an electrically conductive connector element in electrical contact with each said conductor, first and second casings of insulating material bonded to the insulating material of said cables, and an assembly including an electrical circuit element having a terminal in separable engagement with each said connector element and a third casing of insulating material having portions separably overlapping and providing water seals with corresponding portions of said first and second casings and being in interference fit therewith, said third casing having a lengthwise opening and an annular shoulder at one end of said opening and said circuit element having a first portion in said opening, a second portion of larger diameter than said opening and abutting said shoulder, and an abutment facing said first portion, and a spacer having a first portion fixed in said opening and a second portion abutting said abutment, thus positively to position said circuit element with respect to said third casing.

3. The invention set forth in claim 2 wherein said electrical circuit element is a cartridge-type fuse.

4. An electric circuit element assembly adapted for separable water tight connection with each of two electrical connector elements having first and second casings of insulating material, comprising an electrical circuit element and a third casing of insulating material, said circuit element having terminals adapted for separable engagement with said connector elements and said third casing having portions adapted separably to overlap and provide water seals with corresponding portions of said first and second casings in interference fit therewith, said third casing having a lengthwise opening and an annular shoulder at one end of said opening and said circuit element having a first portion in said opening and in snug engagement with the wall of said opening and a second portion of larger diameter than said opening abutting said shoulder to position said circuit element with respect to said third casing.

5. An electrical circuit element assembly adapted for separable water tight connection with each of two electrical connector elements having first and second casings of insulating material, comprising an electrical circuit element and a third casing of insulating material, said circuit element having terminals adapted for separable engagement with said connector elements and said third casing having portions adapted separably to overlap and provide water seals with corresponding portions of said first and second casings in interference fit therewith, said third casing having a lengthwise opening and an annular shoulder at one end of said opening and said circuit element having a first portion in said opening, a second portion of larger diameter than said opening and abutting said shoulder, and an abutment facing said first portion, and a spacer having a first portion fixed in said opening and a second portion abutting said abutment, thus positively to position said circuit element with respect to said third casing.

6. The invention set forth in claim 5 wherein said electrical circuit element is a cartridge-type fuse.

7. An electrical connection between a plurality of cables each of which has a conductor covered with insulating material, comprising an electrically conductive connector element in eletrical contact with each said conductor, first and second casings of insulating material associated with said cables, and an assembly including an electrical circuit element having a terminal in separable engagement with each said connector element and a third casing of insulating material between said first and second casings and having portions separably overlapping and providing water seals with corresponding portions of said first and second casings and being in interference fit therewith, one of said water seals offering substantially less resistance to separation than the other, said circuit element being held in predetermined position with respect to said third casing and having a first portion within said third casing and a second portion outside said third casing at the end thereof corresponding to said water seal offering less resistance.

8. An electrical connection between first and second cables each of which has a conductor covered with insulating material, comprising an electrically conductive connector element in electrical contact with each said conductor, a first casing of insulating material associated with said first cable and having an external surface, a second casing of insulating material associated with said second cable and having an internal surface, and an assembly including an electrical circuit element having a terminal in separable engagement with each said connector element and a third casing of insulating material between said first and second casings and having internal and external surfaces, said internal surface of said third casing separably overlapping and providing a first water seal with said external surface of said first casing in interference fit therewith and said external surface of said third casing separably overlapping and providing a second water seal with said internal surface of said second casing in interference fit therewith, said first water seal offering substantially greater resistance to separation than said second water seal, said circuit element being held in predetermined portion with respect to said third casing and having a portion within said third casing.

9. An electrical connection between first and second cables each of which has a conductor covered with insulating material, comprising a first electrically conductive connector element in electrical contact with the conductor of said first cable, a second electrically conductive connector element in electrical contact with the conductor of said second cable, a first casing of insulating material associated with said first cable and having an external surface, a second casing of insulating material associated with said second cable and having an internal surface, and an assembly including an electrical circuit element having a first terminal separably engaging said first connector element and a second terminal separably engaging said second connector element and a third casing of insulating material between said first and second casings and having at one end an internal surface and at the other end an external surface, said internal surface of said third casing separably overlapping and providing a first water seal with said external surface of said first casing in interference fit therewith and said external surface of said third casing separably overlapping and providing a second water seal with said internal surface of said second casing in interference fit therewith, said first water seal offering greater resistance to separation than said second water seal, said circuit element being held in predetermined position with respect to said third casing and said first terminal being within said internal surface of said third casing and said second terminal being outside said third casing and a portion of said circuit element intermediate said terminals being within said third casing.

10. An electrical connection between first and second cables each of which has a conductor covered with insulating material, comprising a first electrically conductive connector element in electrical contact with the conductor of said first cable, a second electrically conductive connector element in electrical contact with the conductor of said second cable, a first casing of insulating material associated with said first cable and having an external surface, a second casing of insulating material associated with said second cable and having an internal surface, and an assembly including an electrical circuit element having a first terminal separably engaging said first connector element and a second terminal separably engaging said second connector element and a third casing of insulating material between said first and second casings and having at one end an internal surface and at the other end an external surface, said internal surface of said third casing separably overlapping and providing a first water seal with said external surface of said first casing in interference fit therewith and said external surface of said third casing separably overlapping and providing a second water seal with said internal surface of said second casing in interference fit therewith, said circuit element being held in predetermined position with respect to said third casing and said first terminal being within said internal surface of said third casing and said second terminal being outside said third casing and a portion of said circuit element intermediate said terminals being within said third casing, each of said casings having an external exposed portion, the external exposed portion of each of said second and third casings a substantial part of the total extent of all said external exposed portions and the external exposed portion of said first casing providing a minor part of the total extent of all said external exposed portions, the external exposed portions of said second and third casings providing grips for breaking the connection between said second connector element and said second terminal.

11. An electrical circuit element assembly adapted for separable water tight connection with each of two electrical connector elements having first and second casings of insulating material, comprising an electrical circuit element and a third casing of insulating material, said circuit element having terminals adapted for separable engagement with said connector elements and said third casing adapted to be between said first and second casings and having portions adapted separably to overlap and provide water seals with corresponding portions of said first and second casings in interference fit therewith, one of said water seals offering substantially less resistance to separation than the other, said circuit element being in predetermined position with respect to said third casing and having a first portion within said third casing and a second portion outside said third casing at the end thereof corresponding to said water seal offering less resistance.

12. An electrical circuit element assembly adapted for separable water tight connection with first and second connector elements having first and second casings of insulating material, respectively, said first casing having an external surface and said second casing having an internal surface, said assembly comprising an electrical circuit element having first and second terminals adapted for separable engagement with said first and second connector elements, respectively, and a third casing of insulating material having internal and external surfaces, said internal surface of said third casing adapted separably to overlap and provide a first water seal with said external surface of said first casing in interference fit therewith and said external surface of said third casing adapted separably to overlap and provide a second water seal with said internal surface of said second casing in interference fit therewith, said first water seal offering substantially greater resistance to separation than said second water seal, said circuit element being held in predetermined position with respect to said third casing and having a portion within said third casing.

13. An electrical circuit element assembly adapted for separable water tight connection with first and second connector elements having first and second casings of insulating material, respectively, said first casing having an external surface and said second casing having an internal surface, said assembly comprising an electrical circuit element having first and second terminals adapted for separable engagement with first and second connector elements, respectively, and a third casing of insulating material having at one end an internal surface and at the other end an external surface, said internal surface of said third casing adapted separably to overlap and provide a first water seal with said external surface of said first casing in interference fit therewith and said external surface of said third casing adapted separably to overlap and provide a second water seal with said internal surface of said second casing in interference fit therewith, said first water seal offering substantially greater resistance to separation than said second water seal, said circuit element being held in predetermined position with respect to said third casing and said first terminal being within said internal surface of said third casing and said second terminal being outside said third casing and a portion of said circuit element intermediate said terminals being within said third casing.

14. An electrical circuit element assembly adapted for separable water tight connection with first and second connector elements having first and second casings of insulating material, respectively, said first casing having an external surface and said second casing having an internal surface, said assembly comprising an electrical circuit element having first and second terminals adapted for separable engagement with said first and second connector elements, respectively, and a third casing of insulating material having at one end an internal surface and at the other end an external surface of substantially less area than said internal surface of said third casing, said internal surface of said third casing adapted separably to overlap and provide a first water seal with said external surface of said first casing in interference fit therewith and said external surface of said third casing adapted separably to overlap and provide a second water seal with said internal surface of said second casing in interference fit therewith, said circuit element being held in predetermined position with respect to said third casing and said first terminal being within said internal surface of said third casing and said second terminal being outside said third casing and a portion of said circuit element intermediate said terminals being within said external surface of said third casing.

References Cited in the file of this patent

UNITED STATES PATENTS

| | | |
|---|---|---|
| 2,683,200 | Matthysse | July 6, 1954 |
| 2,700,085 | Breisch et al. | Jan. 18, 1955 |
| 2,758,291 | Richards | Aug. 7, 1956 |
| 2,785,319 | Simpson et al. | Mar. 12, 1957 |

FOREIGN PATENTS

| | | |
|---|---|---|
| 490,013 | Great Britain | Aug. 5, 1938 |